(12) United States Patent
Albal

(10) Patent No.: US 6,668,046 B1
(45) Date of Patent: Dec. 23, 2003

(54) METHOD AND SYSTEM FOR GENERATING A USER'S TELECOMMUNICATIONS BILL

(75) Inventor: Nandakishore Anant Albal, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/313,688

(22) Filed: May 18, 1999

(51) Int. Cl.⁷ .............................................. H04M 15/00
(52) U.S. Cl. ............. 379/119; 379/114.01; 379/114.03; 379/114.05; 379/114.28; 379/115.01; 379/120; 379/126; 379/221.02
(58) Field of Search .................... 379/111–120, 126, 379/133, 134, 135, 121, 127, 112.01, 114.01, 114.02, 114.03, 114.05, 114.28, 114.29, 201.02, 221.02; 455/405–408; 705/40, 400

(56) References Cited

U.S. PATENT DOCUMENTS

| | | | | |
|---|---|---|---|---|
| 5,003,584 A | * | 3/1991 | Benyacar et al. ............ | 379/119 |
| 5,146,491 A | * | 9/1992 | Silver et al. ................. | 379/114 |
| 5,276,444 A | * | 1/1994 | McMair ....................... | 379/112 |
| 5,483,445 A | * | 1/1996 | Pickering ..................... | 705/40 |
| 5,506,893 A | * | 4/1996 | Buscher et al. .............. | 379/114 |
| 5,684,965 A | * | 11/1997 | Pickering .................... | 395/234 |
| 5,794,221 A | * | 8/1998 | Egendorf ..................... | 705/40 |
| 5,848,140 A | * | 12/1998 | Foladare et al. ............. | 379/201 |
| 5,864,610 A | * | 1/1999 | Ronen .......................... | 379/127 |
| 5,884,284 A | * | 3/1999 | Peters et al. .................. | 705/30 |
| 5,960,416 A | * | 9/1999 | Block ........................... | 705/34 |
| 5,982,864 A | * | 11/1999 | Jagadish et al. ............. | 379/115 |
| 5,995,946 A | * | 11/1999 | Auzenne et al. .............. | 705/34 |
| 6,018,575 A | * | 1/2000 | Gross et al. ................. | 379/220 |
| 6,023,470 A | * | 2/2000 | Lee et al. .................... | 370/401 |
| 6,047,051 A | * | 4/2000 | Ginzboorg et al. ......... | 379/130 |
| 6,047,268 A | * | 4/2000 | Bartoli et al. ............... | 705/35 |
| 6,052,447 A | * | 4/2000 | Golden et al. ......... | 379/114.01 |
| 6,084,953 A | * | 7/2000 | Bardenheuer et al. ...... | 379/114 |
| 6,091,944 A | * | 7/2000 | Friend ......................... | 455/409 |
| 6,104,704 A | * | 8/2000 | Buhler et al. ............... | 370/252 |
| 6,115,458 A | * | 9/2000 | Taskett .................. | 379/114.01 |
| 6,163,602 A | * | 12/2000 | Hammond et al. .... | 379/114.01 |
| 6,196,458 B1 | * | 3/2001 | Walker et al. ............... | 235/380 |
| 6,266,401 B1 | * | 7/2001 | Marchbanks et al. ....... | 379/116 |
| 6,459,779 B2 | * | 10/2002 | Wardin et al. ......... | 379/112.01 |

* cited by examiner

Primary Examiner—Curtis Kuntz
Assistant Examiner—Duc Tran
(74) Attorney, Agent, or Firm—James E. Gauger; Hisashi D. Watanabe

(57) ABSTRACT

A method for generating a bill includes a communication node including an address book. A determination is made as to whether a phone number called by the user matches a stored number in the address book. A bill including a name and a location associated with the stored number is generated.

3 Claims, 5 Drawing Sheets

TYPICAL ITEMIZED CHARGES PAGE FOR LD SERVICE (SUBSCRIBER'S BILL)

| MONTHLY SERVICE CHARGES FOR CALLING PLAN | $20.00 |
|---|---|
| TOTAL MONTHLY SERVICE CHARGE | $20.00 |

LONG DISTANCE CHARGES

| No. | DATE | TIME | PLACE CALLED | PARTY CALLED | TYPE | TRANSPORT AND CARRIER | MIN /PAGES | QoS | AMOUNT |
|---|---|---|---|---|---|---|---|---|---|
| 1. | 10-4 | 1209P | NAPERVILLE | BOB AT WORK | VOICE | PSTN/AT&T | 50M | 3.9 | 5.00 |
| 2. | 10-5 | 0900A | BROOKLYN NY | JEAN AT WORK | FAX | INTERNET | 12P | HIGH | 1.29 |
| 3. | 10-5 | 0857P | SHANGHAI, CHINA | JOE ON MOBILE PHONE | VOICE | SATELLITE | 12 | 3.7 | 36.00 |
| 4. | 10-8 | 0300P | PALO ALTO, CA | PEDRO AT HOME | VOICE | INTERNET | 44 | 3.9 | 4.44 |
| 5. | 10-10 | 0400P | TORONTO CANADA | MIKE ON CAR PHONE | VOICE | CELLULAR | 32 | 3.8 | 4.10 |
| 6. | 10-14 | 1000P | MIAMI, FL | JOE AT WORK | VOICE | PSTN/MCI | 65 | 3.95 | 6.50 |
| 7. | 10-22 | 0600A | LONDON, UK | IAN AT WORK | VOICE | INTERNET AND PSTN | 44 | 3.75 | 23.23 |
| 8. | 10-30 | 0730P | SHANGHAI, CHINA | JOE ON MOBILE PHONE | VOICE | SATELLITE | 10 | 3.6 | 30.56 |
| | TOTAL ITEMIZED CALLS | | | | | | | | 122.43 |

CONTENT CHARGES

| No. | REQUEST DATE | TIME | CONTENT SOURCE | SIZE | DELIVERY DATE | DELIVERY TIME | DELIVERED TO | AMOUNT |
|---|---|---|---|---|---|---|---|---|
| 1. | 10-4 | 1200P | CNN | 12M | 10-6 | 0700A | CELL PHONE | 3.23 |
| 2. | 10-6 | 0900A | WEATHER CHANNEL | 1M | 10-6 | 0900A | OFFICE PHONE | 1.29 |
| 3. | 10-22 | 1200A | WSJ ASIA | 14M | 10-23 | 0800P | OFFICE FAX | 3.00 |
| 4. | 10-28 | 0300P | JAPAN WATCH | 25M | 10-28 | 0300P | HOME FAX | 4.92 |
| | TOTAL ITEMIZED CONTENT CHARGES | | | | | | | 12.44 |

ITEMIZED PURCHASES CHARGES

| No. | PURCHASE DATE | TIME | ORGANIZATION | AMOUNT |
|---|---|---|---|---|
| 1. | 10-1 | 0800A | FLOWERS FOR ALL | 32.32 |
| 2. | 10-22 | 1200A | YOUR CHEF | 32.23 |
| | TOTAL ITEMIZED PURCHASE CHARGES | | | 64.55 |

| TAXES | |
|---|---|
| FEDERAL | $14.65 |
| STATE | $3.70 |
| LOCAL AND OTHER | $1.86 |
| TOTAL TAXES | $20.21 |

FIG. 5

METHOD AND SYSTEM FOR GENERATING A USER'S TELECOMMUNICATIONS BILL

FIELD OF THE INVENTION

The present invention relates generally to billing systems, and more particularly, to a consolidated billing system and method for telecommunication and Internet services.

BACKGROUND OF THE INVENTION

A user may access telecommunication services in the current telecommunication environment by subscribing to conventional telecommunication carriers such as, for example, an Incumbent Local Exchange Carrier (ILEC), a Competitive Local Exchange Carrier (CLEC), a Satellite Carrier, or a Cellular Carrier. These carriers typically provide telecommunication services by transporting the calls on the Public Switched Telephone Network (PSTN). When the user selects a carrier, it is assigned a telephone number which is "owned" by the carrier. When the user utilizes the telecommunication services, the user typically receives a bill at the end of the month, which details the service usage. The details of the service usage, however, are typically limited to the placed called, the called number, and the associated data, time, duration and cost of the service. Since the called number may not be "owned" by the carrier providing the bill, the service provider does not provide the identity of the called party by name, and is only able to provide basic information.

A conventional bill for telecommunication services typically includes itemized charges for long distance charges as well as the information about each call, such as, for example, the date the call was made, the time the call was made, the place called, the number called, the code (i.e. day or evening), the length of the call and the amount of the call. However, it may be difficult for the user to identify and confirm the calls based on this limited information, especially when the bill may not received until several weeks after the calls are made. Moreover, the user may be unable to select the type of transport (i.e. PSTN or Internet) or the type of carrier on the selected transport to effect the connection for the user in certain applications such as, for example, voice over the internet applications (VOIP). As a result, conventional bills for telecommunication systems typically do not provide information concerning the transport selected, the carrier selected, or the quality of service for a particular call.

Attempts to identify the called party based on the called number using publicly available CD's having the names and addresses of people and businesses have usually been unsuccessful due to the fact that the information on these CD's is typically not up to date. Moreover, publicly available CD's may be rendered useless for this application once Local Number Portability becomes a reality.

Internet service providers (ISP) typically bill users of the Internet based on a flat monthly rate or a flat rate plus usage (connect time) for Internet access. The disadvantage of this arrangement is that the user is not presented with a bill that provides detailed information with respect to each purchase of goods or services from the Internet. Moreover, if the user desires to purchase a product or service advertised on the Internet, the transaction is between the user and the provider of the goods or services, and the ISP is not involved. Any purchases that are made by the subscriber are therefore transparent to the ISP. As a result, when using a credit card to purchase goods or services from the Internet, the user may have to disclose confidential credit card information to the provider of the goods or services.

In some cases, the user may purchase goods, services, or content by calling a special number such as, for example, a "900" number. However, the charges for these types of purchases may only be reflected as a call to the special number on the telecommunication bill. Moreover, when purchasing content based information from the Internet such as, for example, news information, weather reports, etc., the user typically has no means to route the information to a specific device such as a cellular phone, an office phone, an office facsimile machine, or home facsimile machine.

Certain carriers that provide multiple services such as wireline, wireless and paging services do provided consolidated billing for these services. However, ISP's and telecommunication carriers are typically operated separately. As a result, conventional billing systems typically do not provide consolidated billing for telecommunication and Internet services. As a result, a user may receive multiple bills from various service providers, which can be inconvenient for the user. Moreover, bill consolidation for telecommunication and Internet services may be required as service providers integrate these two technologies with technological advances such as, for example, voice over the internet.

In a conventional billing system, the Call Detail Record (CDR) tracks the usage of the telecommunications service by a caller. At the end of the billing cycle, the calls are rated based on the CDR and a bill assigned to that caller is generated for the telecommunication services used. The bill typically only includes basic information such as, for example, the date, the time, the place called, the number called, and duration of the call. The caller may also subscribe to an Internet Service Provider (ISP). The ISP provides access to the Internet so that the caller can have access to content, goods or services of interest to the caller. The caller typically pays the merchant for any content, goods, or services directly or by using telecommunication services such as, for example, dialing a "900" number. The caller's bill for telecommunication services usually does not include any information relating to the Internet content, goods, or services purchased by the caller.

BRIEF DESCRIPTION OF THE DRAWINGS

FIG. 5 illustrates one embodiment of a subscriber bill; and

DETAILED DESCRIPTION OF THE PRESENTLY PREFERRED EMBODIMENTS

Figure 1:
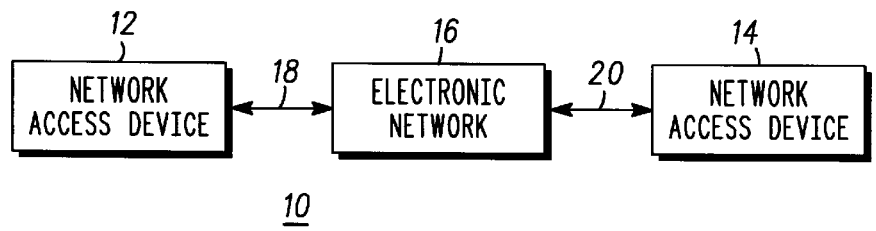
FIG. 1 is a block diagram of an embodiment of a communication system in accordance with the present invention.

FIG. 1 is a block diagram that illustrates an embodiment of a communication system 10. The communication system 10 generally includes one or more network access apparatus or communication devices 12 and 14 (two being shown) and an electronic network 16.

The communication system 10 can provide various services and capabilities to cellular subscribers, wireline subscribers, paging subscribers, satellite subscribers, mobile or portable phone subscribers, trunked radio subscribers, computer network subscribers (i.e., internet subscribers, intranet subscribers, etc.), wireless data subscribers, branch office users, and the like. For example, the communication system 10 can provide speech recognition, incoming call authorization, call routing, text-to-speech capabilities, touch-tone recognition, content information, speech-to-text capabilities, messaging services, call screening, interactive voice applications, voice mail, voice dialing, etc.

The network access apparatus 12 and 14 of the communication system 10 can be utilized by the subscribers or users to access and/or connect with the electronic network 16. The network access apparatus 12 and 14 of the system can have a variety of forms, including but not limited to, a telephone, a mobile phone, an office phone, a work phone, a home phone, a pay phone, a paging unit, a radio unit, a wireless data device, a web phone, a portable or wireless phone, a personal information manager (PIM), a personal digital assistant (PDA), a general purpose computer, a network television, an Internet television, an Internet telephone, a portable wireless device, a workstation, or any other suitable communication device. It is contemplated that the network access apparatus can be integrated with the electronic network. For example, the network access apparatus and the electronic network can reside in a personal computer.

The network access apparatus 12 and 14 may also include a voice or web browser, such as, a Netscape Navigator® web browser, a Microsoft Internet Explorer® web browser, a Mosaic® web browser, etc. It is also contemplated that the network access apparatus 12 and 14 can include an optical scanner or bar code reader to read machine readable data, magnetic data, bar code, optical data, or the like, and transmit the data to the electronic network 16.

The electronic network 16 is communicatively coupled to the network access apparatus 12 via a line 18, and the electronic network 16 is communicatively coupled to the network access apparatus 14 via a line 20. The lines 18 and 20 can include, but are not limited to, a telephone line or link, an ISDN line, a coaxial line, a cable television line, a fiber optic line, a computer network line, a digital subscriber line, a dedicated line, a pay or lease line, a virtual private network, or the like. Alternatively, the network access apparatus 12 and 14 can wirelessly communicate with the electronic network. For example, the electronic network 14 can communicate with the network access apparatus 12 and 14 by a satellite communication system, a wireline communication system, or a wireless communication system.

The electronic network 16 can receive incoming transmissions or data (i.e., paging and voice transmissions, e-mails, faxes, etc.) from the network access apparatus 12 and can route the incoming transmissions to network access apparatus 14 or back to the network access apparatus 12. The electronic network 16 can include, but is not limited to, an intranet, an extranet, a local area network, a telephone network, (i.e., a public switched telephone network), a cellular telephone network, a personal communication system (PCS) network, a television network (i.e., a cable television system), a paging network (i.e., a local paging network), a regional paging network, a national or a global paging network, an e-mail system, a wireless data network (i.e., a satellite data network or a local wireless data network), a wireless LAN, a VOIP network and/or a telecommunication node. The electronic network 16 can also include an open, wide area network such as the Internet, the World Wide Web (WWW), and/or an on-line service.

The electronic network 16 can provide various calling capabilities to a user. For example, the network can place a call to a particular contact at a selected location or device in response to speech commands or DTMF tones from the user (i.e., "call Bob at home", "call Ann Jones at work", or "dial Bill on mobile phone"). If the user does not specify the location of the party or the device to call, the network can automatically prompt the user for the location of the party and/or the device (i.e., "the valid locations for Bob are home, work, and mobile phone"). Alternatively, the user can program the network to automatically call a default or designated number of the party.

In addition to the calling capabilities of the system, the electronic network enables the user to access content information from various content providers using speech commands or DTMF tones. For example, the users can access up-to-date information, such as, news updates, designated city weather, traffic conditions, stock quotes, calendar information, user information, address information, stock market indicators, yellow pages, directions, traffic, movie information, concert information, airline information, weather information, new reports, financial data, flower information, personal data, calendar data, address data, book information, e-commerce, banking, v-commerce, etc. The network can also send reminders or updates to the user about various events and can allow the users to perform various transactions (i.e., order flowers, place orders from restaurants, place buy and sell stock orders, obtain bank account balances, obtain telephone numbers, receive directions to various destinations, etc.).

The electronic network 16 further enables a user to initiate and respond to pages and/or content through speech or voice commands (i.e., "page Bob"). The network receives pages and/or content and sends the pages and/or content to users. When a user pages a party or contact, the network can automatically provide the ANI or CLI of the network access apparatus (i.e. a telephone) that the user is using as a callback number. Alternatively, the user can enter a desired callback number. The user can also access and display information provided by the network.

The electronic network also allows a user to perform a series of transactions without having to terminate the original call to the system. For example, the user can access a news update, send or receive a page, read e-mail, read a personal calendar, read a "to-do" list and place an outgoing call to a party, all without having to dial additional numbers or terminate the original call.

Furthermore, a user can read or modify a personal file or address book stored in the network through the network access apparatus. The address book preferably stores names of parties along with their addresses and phone numbers as further described below. Once the user accesses his or her personal address book, the electronic network can read information about one or more of the parties stored in the address book and can provide various details to the user (i.e., addresses, etc.) of each party. After the network has read the name of the party, the user can call the party by using voice commands (i.e., "call Bob"). The subscriber can also enter frequently dialed numbers for voice activated dialing using voice commands or through an electronic network. The electronic network 16 includes a billing system (not shown) as further described below, to generate bills for the services used by the subscriber.

Figure 2:
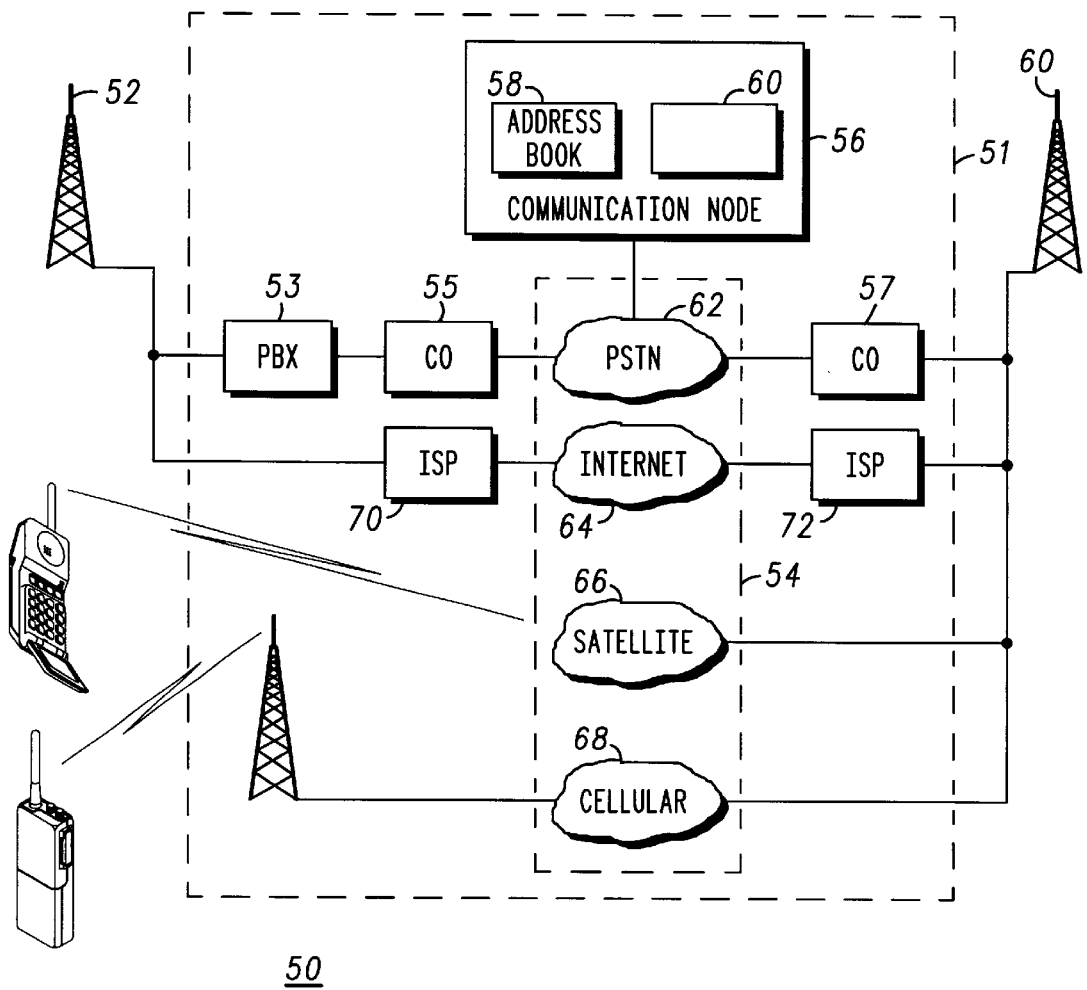
FIG. 2 is an exemplary block diagram of another embodiment of a communication system in accordance with the present invention.

FIG. 2 illustrates another embodiment of a communication system 300 having a billing system 60. The billing system 60 generally provides a consolidated bill that combines charges for telecommunication, facsimile, paging, and Internet services on a single bill. The bill includes detailed information for telecommunication services, facsimile services, e-mail services, paging, and Internet services. For example, the bill provides an identification of the name and location of the party called, along with the date, time, and duration of the call for telecommunication and fax services. The bill also identifies the transport system and carrier selected, along with the Quality of Service (QoS) for the call. Finally, the bill identifies Internet services by name and content.

As shown in FIG. 2, the communication system 50 generally includes an electronic network 51, a first communication device 52 and a second communication device 60. The first communication device 52 can be any electronic device capable of sending and receiving electronic signals such as, for example, a telephone, a conventional computer having a sound card, a satellite phone (e.g. Iridium), a cellular phone, a pager or a computer with VOIP capability. Similarly, the second communication device 60 can be any be any electronic device capable of sending and receiving electronic signals such as, for example, a telephone, a conventional computer having a sound card, a satellite phone (e.g. Iridium), a cellular phone, or a pager or a computer with VOIP capability.

The electronic network 51 of the communication system 50 includes a transport system 54 and a communication node 56. The transport system 54 is in communication with the communication node 56. It is contemplated that the communication node can be integrated in the transport system or can be remote from the transport system. The transport system 54 routes calls from the first communication device 52 to the communication node 56 and from the communication node 56 to the second communication device 60. As illustrated in FIG. 2, the transport system 54 can be a public switched telephone network (PSTN) 62, the Internet 64, a satellite network 66, a cellular network 68, or any other suitable network. When the PSTN 64 operates as the transport system, the first communication device 52 can be operatively connected to the transport system 54 through a conventional private branch exchange (PBX) 53 and a central office 55 (CO) of the carrier. Similarly, the second communication device 60 can be operatively connected to the transport system 54 through the central office 57 of the carrier. When the Internet 64 operates as the transport system, an Internet Service Provider 70 operatively connects the first communication device 52 to the Internet 64. Similarly, Internet Service Provider 72 operatively connects the Internet 64 to the second communication device 60.

The communication node 56 of the electronic network 51 includes an address book 58 and the billing system 60. An example of a communication node 56 is the Myosphere Service Plafform provided by Motorola, Schaumburg, Illinois and as further described above with respect to FIG. 6. In a preferred embodiment, each subscriber has an associated subscriber number. When the subscriber inputs the access or phone number of the communication node 56 into the first communication device 52, the subscriber is connected to the communication node 56. Once the subscriber is connected to the communication node 56, the subscriber can instruct the communication node 56 to place a call to party at the second communication device 60. The communication node 56 can place the call to the called party by using the data contained in the subscriber's address book 58. The address book 58 is preferably a database or server that contains information on the subscriber's contacts or parties (i.e., first and last name, home phone, work phone, mobile phone, street address, email address, credit card number, etc.) and includes software to carry out the routines described in reference to FIG. 4.

Figure 3:
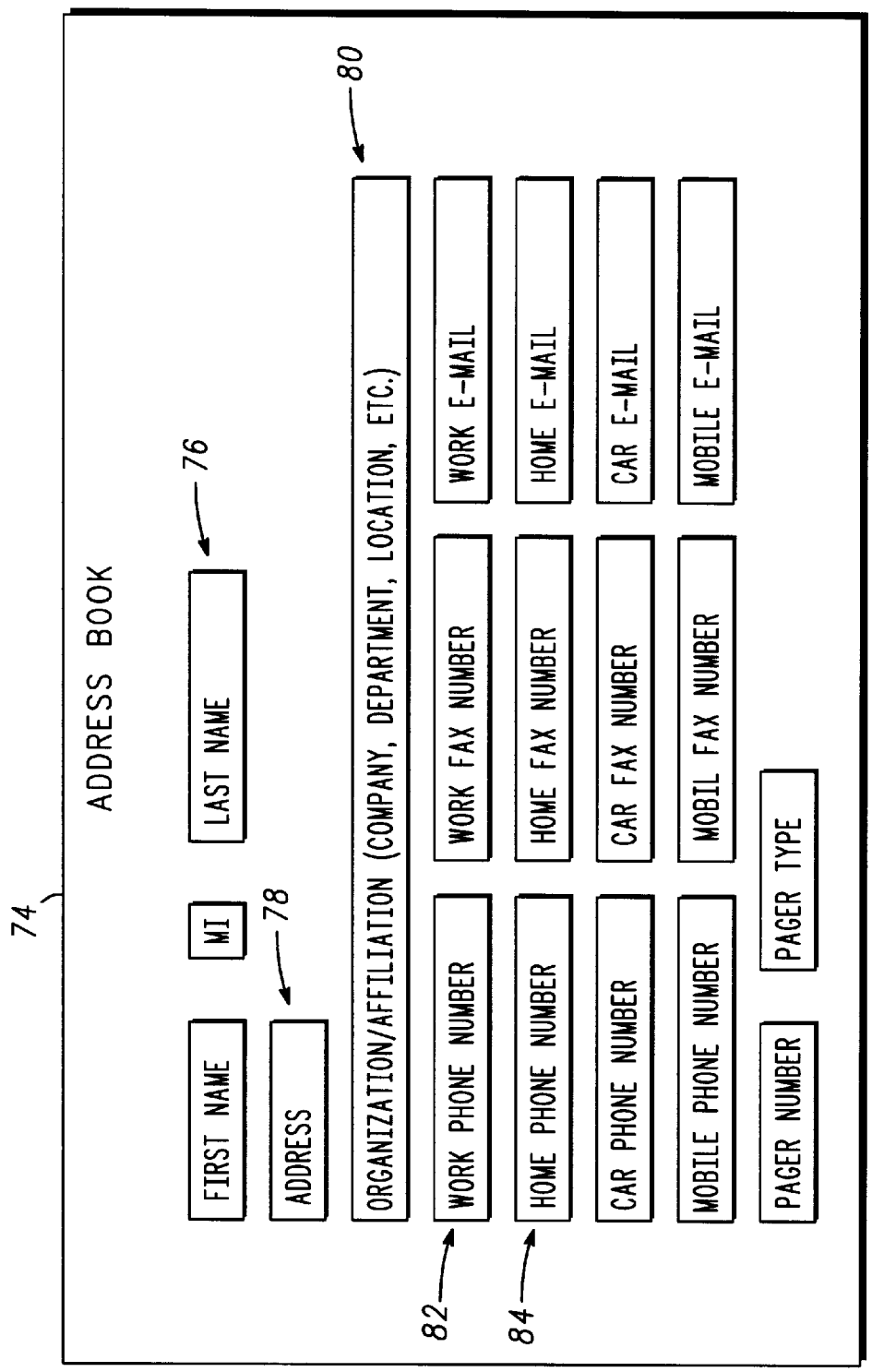
FIG. 3 is an exemplary block diagram of an address book.

An example of an address book 74 is illustrated in FIG. 3. As shown in FIG. 3, the address book 74 includes information on one subscriber's contacts including, for example, the contact's name 76, address 78, organization/affiliation 80, work phone number 82, home phone number 84, etc. The subscriber may instruct the communication node 56 to modify or change the contents of the address book 58 using voice commands or may change the content of the address book via the Internet.

The billing system 60 records or stores information about the subscriber's use of the services of the communication node (i.e., length of calls, long distance charges, features accessed by the user, etc.) After the subscriber terminates the use of the communication node, the communication node records the data in the billing system. At the end of the billing cycle, the billing system 60 of the communication node 56 generates a bill that includes the name and location of the receiving or called party. The communication node 56 identifies the name and location of the called party by accessing the address book 58, and translating the called number into the name and location of the receiving party. As a result, a line item on the subscriber bill can preferably include the date, time, duration, the called party's name (i.e., person or corporation), and cost of the call. The line items may also preferably include the called party's location where they were called (i.e., home, office/work, car, etc.). It is contemplated that the communication node 56 may also carry out the translation by accessing any number of remote access databases including, for example, publicly available CDs with names and addresses of people and businesses. It is also contemplated that the billing system may also create a call detail record having the information described above after the call is completed.

It is contemplated that the billing system 60 of the communication node 56 can support various billing models including billing once-a-cycle, pre-paid, credit card, debit cards, debit accounts, etc. It is also contemplated that the bill presented to the subscriber can have multiple forms such as, for example, paper bills sent via surface mail, e-mail/Internet based bill delivery, and the presentation of bills and recent charges on web pages accessible by the subscriber.

In addition to the above, the communication node 56 may also send and receive faxes and e-mail. Again, the address book 58 (or in the alternative a public repository) may be used to identify the receiving party, and this information may preferably be presented on the subscriber's bill.

When the subscriber accesses the communication node 56, the subscriber may preferably instruct the communication node 56 to select the type of transport system 54 (i.e., PSTN 62, Internet 64, Satellite Network 66, or Cellular Network 68) and the carrier on the selected transport to effect the connection for the subscriber. Alternatively, the transport system 54 may be a Voice Over Internet Protocol (VOIP). The advantage is that the selection of the least expensive transport to meet the stated communication parameters established by the subscriber (such as Qos) reduces the cost of the call to the subscriber. Moreover, the subscriber can select the transport system that provides the desired Quality of Service (QoS). Since the communication node 56 selects the transport system and the carrier based on instructions from the subscriber, this information (transport, carrier, QoS) may also be documented on the bill for each call. This documentation confirms to the subscriber (or corporate client) that the communication node 56 is using the specified transport and carrier. This documentation also notifies the subscriber when billing adjustments are made to the subscriber's bill and in the Carrier Revenue Assurance process.

In addition to supporting telecommunication services, the communications node 56 facilitates the access to the Internet for subscribers, including the purchasing of Internet based content. When content is purchased, the communication node 56 can function as an agent of the content provider (if the communication node 56 functions as a reseller), or an authorized agent of the subscriber (when the communication node 56 "pays" for content on behalf of the subscriber). In either case, the communication node 56 indicates on the subscriber's bill the transaction details of the service/content along with the date, time, and charge. The bill may also include the details of when the request was made and when the service/content was delivered, in cases where the service/content is delivered after the request is made. In addition, when purchasing content-based information from the Internet such as, for example, news information, weather reports, etc., the subscriber may preferably instruct the communication node 56 to route the information to a specific device. As a result, the bill may also indicate where the information was delivered.

The communication node 56 may also provide to the subscriber access to the bill before the billing cycle is completed. As a result, the subscriber is able to view all of the details of the bill at any time between billing cycles. Such details may include, for example, the receiving party's name, location, and other details of the purchased service or content. Finally, the detailed billing information may be presented on a paper bill, an Internet based bill, a web site based bill, or a user device for real-time billing applications.

Figure 4:
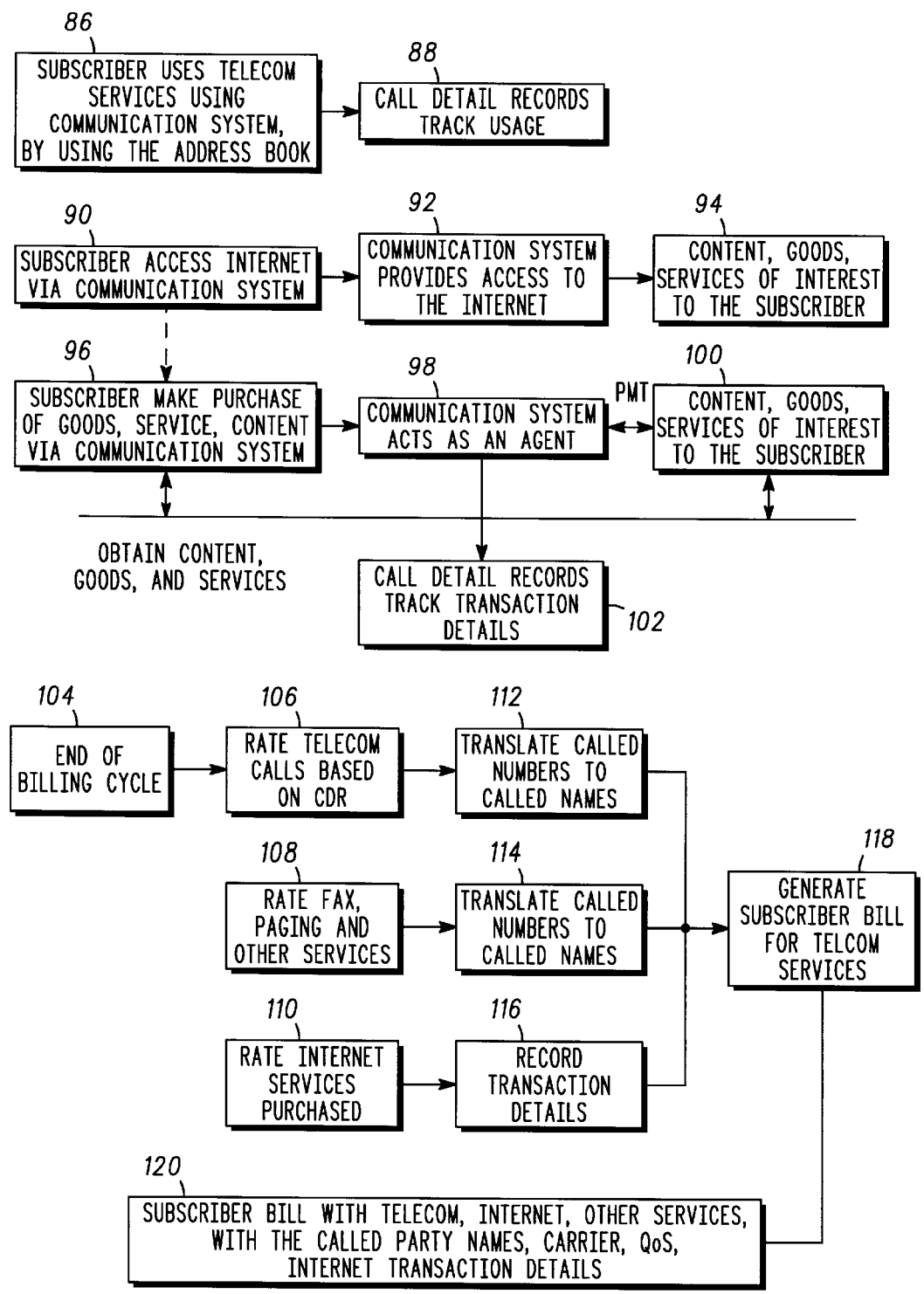
FIG. 4 is a flowchart that illustrates one embodiment of a routine in accordance with the present invention.

FIG. 4 is a flowchart that illustrates one embodiment of a routine in accordance with the present invention. Reference is made to both FIGS. 2 and 4 in the following description. At block 86, the subscriber may use various telecommunication services (such as, for example, telephone services) by accessing the communications node 56, which includes the address book 58. In particular, the subscriber inputs the access number into the first communication device 52 that connects the subscriber to the communication node 56. Once the subscriber is connected to the communication node 56, the subscriber can instruct the communication node 56 to place a call to a receiving party via the second communication device 60. The Call Detail Records (CDR) tracks the subscriber's usage of the telecommunication services at block 88. The subscriber may also access the Internet via the communications node 56 at block 90. The communication node 56 provides the access to the Internet at block 92, which may have content, goods, or services of interest to the subscriber at block 94. If the subscriber desires to make a purchase of good, service or content from the Internet via the communication node 56 at block 96, the communication node 56 functions as an agent of the subscriber at block 98. In particular, the communication node 56 will make the payment to the Internet merchant for the content, goods, or services of interest to the subscriber at block 100. The advantage of this arrangement is that the subscriber does not have to pay the merchant directly and therefore does not have to provide sensitive credit card information to the merchant to make the payment. The CDR tracks all of the transaction details at block 102.

When the billing cycle ends at block 104, the telecommunication calls are rated based on the CDR at block 106. Similarly, facsimile, paging, and other services are also rated at block 108. Finally, the Internet services, goods, or content purchased is rated at block 110. The billing system 60 of the communication node 56 then translates the called numbers into the called party's name and location at blocks 112 and 114 and records the transaction of the Internet service, goods, or content purchased details at block 116. The billing system 60 of the communication node 56 then generates a consolidated subscriber bill for all of the services used (i.e., telecommunications, Internet, facsimile, and other services such as, for example, paging, etc.) at block 118. The subscriber bill includes detailed information including the called or receiving party's name and location, the carrier, the QoS, and the Internet transaction details at block 120.

FIG. 5 illustrates an embodiment of a subscriber bill 122 that includes itemized charges for long distance charges 124, content charges 126, and purchases charges 128. The long distance charges 124 include information concerning the date of the call 130, the time of the call 132, the place called 134, the party called 136, the type of call 140 (i.e. voice or facsimile), the transport system and the carrier used 142, the number of minutes or pages 144, the QoS 146, and the amount of the service 148. The content charges 126 include information concerning the date requested 150, the time of the request 152, the content source 154, the size of the request 156, the delivery date 158, the delivery time 160, where the information was delivered to 162, and the amount of the service 164. The charges for purchases 128 include information concerning the date purchased 166, the time of the purchase 168, the organization from which the item was purchased 170, and the amount 172. The bill may also show applicable surcharges 174.

The detailed information set forth in the subscriber bill 122 shown in FIG. 5 results in an informative and meaningful bill presentation for the subscriber which allows the subscriber to more easily identify various charges on the subscriber bill 122. The subscriber bill 122 also provides the advantage of consolidated billing not just for telecommunication services but for Internet content and services as well. This reduces costs associated with multiple bills for telecommunication and Internet services.

Figure 6:
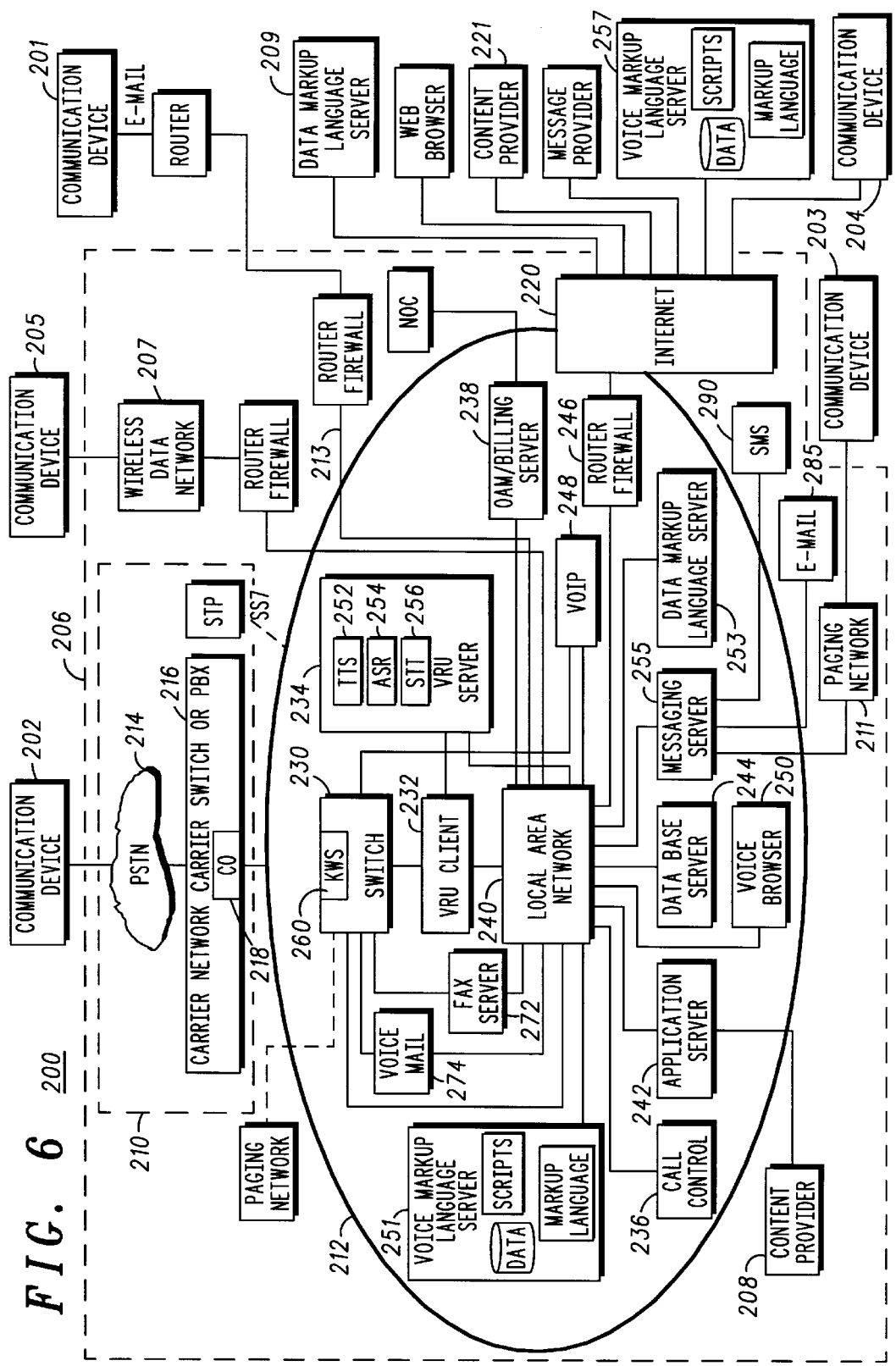
FIG. 6 is an exemplary block diagram of another embodiment of a communication system in accordance with the present invention.

Referring now to FIG. 6, an exemplary block diagram of another embodiment of a communication system 200 having a billing system is illustrated. The system 200 generally includes one or more communication devices or network access apparatus 201, 202, 203, 204, and 205 (five being shown), an electronic network 206, and one or more information sources (i.e., content providers 208 and 221 (two being shown) and data and voice markup language servers 209, 251, 253, 257).

The user can access the electronic network 206 by dialing a single direct access telephone number (i.e., a foreign exchange number, a local number, or a toll-free number or PBX) from the communication device 202. The user can also access the electronic network 206 from the communication device 204 via the Internet or world wide web (WWW), from the communication device 203 via a paging network 211, and from the communication device 201 via a local area network (LAN), wireless data network, a wide area network (WAN), or an e-mail connection. It will be recognized that the system can be accessed in various ways depending on the configuration of the system.

As shown in FIG. 6, the electronic network 206 of the system 200 includes a telecommunication network 210 and a communication node 212.

The telecommunication network 210 is preferably connected to the communication node 212 via a high-speed data link, such as, a T1 telephone line, a local area network (LAN), a wide area network (WAN) or a VOIP network. The telecommunication network 210 preferably includes a public switched network (PSTN) 214 and a carrier network 216. The telecommunication network 210 can also include international or local exchange networks, a cable television network, interexchange carrier networks (IXC) or long distance carrier networks, cellular networks (i.e., mobile switching centers (MSC)), PBXs, satellite systems, wireless data networks, and other switching centers such as conventional or trunked radio systems (not shown), etc. The electronic network can also include additional telecommunication networks, such as a wireless data network 207 or any of the networks or systems described above.

The PSTN 214 of the telecommunication network 210 can include various types of communication equipment or apparatus, such as ATM networks, Fiber Distributed data networks (FDDI), T1 lines, cable television networks, VOIP networks and the like. The carrier network 216 of the telecommunication network 210 generally includes a telephone switching system or central office 218. It will be recognized that the carrier network 216 can be any suitable system that can route calls to the communication node 212, and the telephone switching system 218 can be any suitable wireline or wireless switching system.

The communication node 212 the system 200 is preferably configured to receive and process incoming calls from the carrier network 216 and the Internet 220, such as the WWW. The communication node can receive and process pages from the paging network 211 and can also receive and process messages (i.e., e-mails) from the LAN, WAN, wireless data network or e-mail connection 213.

When a user dials into the electronic network 206 from the communication device 202, the carrier network 216 routes the incoming call from the PSTN 214 to the communication node 212 over one or more telephone lines or trunks. The incoming calls preferably enters the carrier network 216 through one or more "888" or "800" INWATS trunk lines, local exchange trunk lines, or long distance trunk lines. It is also contemplated that the incoming calls can be received from a cable network, a cellular system, VOIP network or any other suitable system.

The communication node 212 answers the incoming call from the carrier network 216 and retrieves an appropriate announcement (i.e., a welcome greeting) from a database, server, or browser. The node 212 then plays the announcement to the caller. In response to audio inputs from the user, the communication node 212 retrieves information from a destination or database of one or more of the information sources, such as the content providers 208 and 221 or the voice or data markup language servers 209, 251, 253 and 257. After the communication node 212 receives the information, the communication node provides a response to the user based upon the retrieved information.

The node 212 can provide various dialog voice personalities (i.e., a female voice, a male voice, etc.) and can implement various grammars (i.e., vocabulary) to detect and respond to the audio inputs from the user. In addition, the communication node can automatically select various speech recognition models (i.e., an English model, a Spanish model, an English accent model, etc.) based upon a user profile, the user's communication device, and/or the user's speech patterns. The communication node 212 can also allow the user to select a particular speech recognition model.

When a user accesses the electronic network 206 from a communication device registered with the system (i.e., a user's home phone, work phone, cellular phone, etc.), the communication node 212 can by-pass a user screening option and automatically identify the user (or the type of the user's communication device) through the use of automatic number identification (ANI) or caller line identification (CLI). After the communication node verifies the call, the node provides a greeting to the user (i.e., "Hi, this is your personal agent, Maya. Welcome Bob. How may I help you?"). The communication node then enters into a dialogue with the user, and the user can select a variety of information offered by the communication node.

When the user accesses the electronic network 206 from a communication device not registered with the system (i.e., a payphone, a phone of a non-subscriber, etc.), the node answers the call and prompts the user to enter his or her name and/or a personal identification number (PIN) using speech commands or DTMF tones. The node can also utilize speaker verification to identify a particular speech pattern of the user. If the node authorizes the user to access the system, the node provides a personal greeting to the user (i.e., "Hi, this is your personal agent, Maya. Welcome Ann. How may I help you?"). The node then enters into a dialogue with the user, and the user can select various information offered by the node. If the name and/or PIN Number of the user cannot be recognized or verified by the node, the user will be routed to a customer service representative.

Once the user has accessed the system, the user may implement a wide variety of services and features by using voice commands, such as, for example, voice dialing, voice paging, facsimiles, caller announcements, voice mails, reminders, call forwarding, call recording, content information (i.e. newspapers, etc.), read e-mail, read calendars, read "to-do" lists, banking, v-commerce, e-commerce, etc. The system can place outbound calls and pages to business and personal parties or contacts (i.e., friends, clients, business associates, family members, etc.) in response to DTMF tones or speech commands. The calls can be routed through a telephone or electronic network to the selected party and the pagers can be sent to a selected party via a paging system. The system can also receive calls routed through a telephone or electronic network.

As shown in FIG. 6, the communication node 212 preferably includes a telephone switch 230, a voice or audio recognition (VRU) client 232, a voice recognition (VRU) server 234, a controller or call control unit 236, an Operation and Maintenance Office (OAM) or a billing server unit 238, a local area network (LAN) 240, an application server unit 242, a database server unit 244, a gateway server or router firewall server 246, a voice over internet protocol (VOIP) unit 248, a voice browser 250, a voice markup language server 251, a messaging server 255, and a data markup language server 253. Although the communication node 212 is shown as being constructed with various types of independent and separate units or devices, the communication node 212 can be implemented by one or more integrated circuits, microprocessors, microcontrollers, or computers which may be programmed to execute the operations or functions equivalent to those performed by the device or units shown. It will also be recognized that the communication node 212 can be carried out in the form of hardware components and circuit designs, software or computer programming, or a combination thereof.

The communication node 212 can be located in various geographic locations throughout the world or the United States (i.e., Chicago, Ill.). The communication node 212 can be operated by one or more carriers (i.e., Sprint PCS, Qwest Communications, MCI, etc.) or independent service providers, such as, for example, Motorola, Inc.

The communication node 212 can be co-located or integrated with the carrier network 216 (i.e., an integral part of the network) or can be located at a remote site from the carrier network 216. It is also contemplated that the communication node 212 may be integrated into a communication device, such as, a wireline or wireless phone, a radio device, a personal computer, a PDA, a PIM, etc. In this arrangement, the communication device can be programmed to connect or link directly into an information source.

The communication node 212 can also be configured as a standalone system to allow users to dial directly into the communication node via a toll free number or a direct access number. In addition, the communication node 212 may comprise a telephony switch (i.e., a PBX or Centrix unit), an enterprise network, or a local area network. In this configuration, the system 200 can be implemented to automatically connect a user to the communication node 212 when the user picks a communication device, such as, the phone.

When the telephone switch 230 of the communication node 212 receives an incoming call from the carrier network 216, the call control unit 236 sets up a connection in the switch 230 to the VRU client 232. The communication node 212 then enters into a dialog with the user regarding various services and functions. The VRU client 232 preferably generates pre-recorded voice announcements and/or messages to prompt the user to provide inputs to the communication node using speech commands or DTMF tones. In response to the inputs from the user, the node 212 retrieves information from a destination of one of the information sources and provides outputs to the user based upon the information.

The telephone switch 230 of the telecommunication node 212 is preferably connected to the VRU client 232, the VOIP unit 248, and the LAN 240. The telephone switch 230 receives incoming calls from the carrier switch 216. The telephone switch 230 also receives incoming calls from the communication device 204 routed over the Internet 220 via the VOIP unit 248. The switch 230 also receives messages and pages from the communication devices 201 and 203, respectively. The telephone switch 230 is preferably a digital cross-connect switch, Model No. LNX, available from Excel Switching Corporation, 255 Independence Drive, Hyannis, Mass. 02601. It will be recognized that the telephone switch 230 can be any suitable telephone switch.

The VRU client 232 of the communication node 212 is preferably connected to the VRU server 234 and the LAN 240. The VRU client 232 processes speech communications, DTMF tones, pages, and messages (i.e., e-mails) from the user. Upon receiving speech communications from the user, the VRU client 232 routes the speech communications to the VRU server 234. When the VRU client 232 detects DTMF tones, the VRU client 232 sends a command to the call control unit 236. It will be recognized that the VRU client 232 can be integrated with the VRU server.

The VRU client 232 preferably comprises a computer, such as, a Windows NT compatible computer with hardware capable of connecting individual telephone lines directly to the switch 230 or carrier network 216. The VRU client preferably includes a microprocessor, random access memory, read-only memory, a T1 or ISDN interface board, and one or more voice communication processing board (not shown). The voice communication processing boards of the VRU client 232 are preferably Dialogic boards, Model No. Antares, available from Dialogic Corporation, 1515 Route 10, Parsippany, N.J. 07054. The voice communication boards may include a voice recognition engine having a vocabulary for detecting a speech pattern (i.e., a key word or phrase). The voice recognition engine is preferably a Rec-Server software package, available from Nuance Communications, 1380 Willow Road, Menlo Park, Calif. 94025.

The VRU client 232 can also include an echo canceler (not shown) to reduce or cancel text-to-speech or playback echoes transmitted from the PSTN 214 due to hybrid impedance mismatches. The echo canceler is preferably included in an Antares Board Support Package, available from Dialogic.

The call control unit 236 of the communication node 212 is preferably connected to the LAN 240. The call control unit 236 sets up the telephone switch 230 to connect incoming calls to the VRU client 232. The call control unit also sets up incoming calls or pages into the node 212 over the internet 220 and pages and messages sent from the communication devices 201 and 203 via the paging network 203 and e-mail system 213. The control call unit 236 preferably comprises a computer, such as, a Window NT compatible computer.

The LAN 240 of the communication node 212 allows the various components and devices of the node 212 to communicate with each other via a twisted pair, a fiber optic cable, a coaxial cable, or the like. The LAN 240 may use Ethernet, Token Ring, or other suitable types of protocols. The LAN 240 is preferably a 100 Megabit per second Ethernet switch, available from Cisco Systems, San Jose, Calif. It will be recognized that the LAN 240 can comprise any suitable network system, and the communication node 212 may include a plurality of LANs.

The VRU server 234 of the communication node 212 is connected to the VRU client 232 and the LAN 240. The VRU server 234 receives speech communications from the user via the VRU client 232. The VRU server 234 processes the speech communications and compares the speech communications against a vocabulary or grammar stored in the database server unit 244 or a memory device. The VRU server 234 provides output signals, representing the result of the speech processing, to the LAN 240. The LAN 240 routes the output signal to the call control unit 236, the application server 242, and/or the voice browser 250. The communication node 212 then performs a specific function associated with the output signals.

The VRU server 234 preferably includes a text-to-speech (TTS) unit 252, an automatic speech recognition (ASR) unit 254, and a speech-to-text (STT) unit 256. The TTS unit 252 of the VRU server 234 receives textual data or information (i.e., e-mail, web pages, documents, files, etc.) from the application server unit 242, the database server unit 244, the call control unit 236, the gateway server 246, the application server 242, and the voice browser 250. The TTS unit 252 processes the textual data and converts the data to voice data or information.

The TTS unit 252 can provide data to the VRU client 232 which reads or plays the data to the user. For example, when the user requests information (i.e., news updates, stock information, traffic conditions, etc.), the communication node 212 retrieves the desired data (i.e., textual information) from a destination of the one or more of the information sources and converts the data via the TTS unit 252 into a response.

The response is then sent to the VRU client 232. The VRU client processes the response and reads an audio message to the user based upon the response. It is contemplated that the VRU server 234 can read the audio message to the user using human recorded speech or synthesized speech.

The TTS unit 252 is preferably a TTS 2000 software package, available from Lernout and Hauspie Speech Product NV, 52 Third Avenue, Burlington, Mass. 01803.

The ASR unit 254 of the VRU server 234 provides speaker dependent or independent automatic speech recognition of speech inputs or communications from the user. It is contemplated that the ASR unit 254 can include speaker dependent speech recognition. The ASR unit 254 processes the speech inputs from the user to determine whether a word or a speech pattern matches any of the grammars or vocabulary stored in the database server unit 244 or downloaded from the voice browser. When the ASR unit 254 identifies a selected speech pattern of the speech inputs, the ASR unit 254 sends an output signal to implement the specific function associated with the recognized voice pattern. The ASR unit 254 is preferably a speaker independent speech recognition software package, Model No. RecServer, available from Nuance Communications. It is contemplated that the ASR unit 254 can be any suitable speech recognition unit to detect voice communications from a user.

The STT unit 256 of the VRU server 234 receives speech inputs or communications from the user and converts the speech inputs to textual information (i.e., a text message). The textual information can be sent or routed to the communication devices 201, 202, 203 and 204, the content providers 208 and 209, the markup language servers, the voice browser, and the application server 242. The STT unit 256 is preferably a Naturally Speaking software package, available from Dragon Systems, 320 Nevada Street, Newton, Mass. 02160-9803.

The VOIP unit 248 of the telecommunication node 212 is preferably connected to the telephone switch 230 and the LAN 240. The VOIP unit 248 allows a user to access the node 212 via the Internet 220 or VOIP public network using voice commands. The VOIP unit 240 can receive VOIP protocols (i.e., H.323 protocols) transmitted over the Internet 220 or intranet and can convert the VOIP protocols to speech information or data. The speech information can then be read to the user via the VRU client 232. The VOIP unit 248 can also receive speech inputs or communications from the user and convert the speech inputs to a VOIP protocol that can be transmitted over the Internet 220. The VOIP unit 248 is preferably a Voice Net software package, available from Dialogic Corporation. It will be recognized that the VOIP device can be incorporated into a communication device.

The telecommunication node 212 also includes a detection unit 260. The detection unit 260 is preferably a phrase or key word spotter unit to detect incoming audio inputs or communications or DTMF tones from the user. The detector unit 260 is preferably incorporated into the switch 230, but can be incorporated into the VRU client 232, the carrier switch 216, or the VRU server 256. The detection unit 260 is preferably included in a RecServer software package, available from Nuance Communications.

The detection unit 260 records the audio inputs from the user and compares the audio inputs to the vocabulary or grammar stored in the database server unit 244. The detector unit continuously monitors the user's audio inputs for a key phase or word after the user is connected to the node 212. When the key phrase or word is detected by the detection unit 260, the 25 VRU client 232 plays a pre-recorded message to the user. The VRU client 232 then responds to the audio inputs provided by the user.

The billing server unit 238 of the communication node 212 is preferably connected to the LAN 240. The billing server unit 238 can record data about the use of the communication node by a user (i.e., length of calls, features accessed by the user, etc.). Upon completion of a call by a user, the call control unit 236 sends data to the billing server unit 238. The data can be subsequently processed by the billing server unit in order to prepare customer bills as described above. The billing server unit 238 can use the ANI or CLI of the communication device to properly bill the user. The billing server unit 238 preferably comprises a Windows NT compatible computer.

The gateway server unit 246 of the communication node 212 is preferably connected to the LAN 240 and the Internet 220. The gateway server unit 246 provides access to the content provider 208 and the markup language server 257 via the Internet 220. The gateway unit 246 also allows users to access the communication node 212 from the communication device 204 via the Internet 220. The gateway unit 246 can further function as a 10 firewall to control access to the communication node 212 to authorized users.

The gateway unit 246 is preferably a Cisco Router, available from Cisco Systems, San Jose, Calif.

The database server unit 244 of the communication node 212 is preferably connected to the LAN 240. The database server unit 244 preferably includes a plurality of storage areas to store data relating to users, speech vocabularies, dialogs, personalities, user entered data, and other information. Preferably, the database server unit 244 stores a personal file or address book as described above in reference to FIG. 3. The personal address book can contain information required for the operation of the system, including user reference numbers, personal access codes, personal account information, contact's addresses, and phone numbers, etc. The database server unit also stores user data, such as the user's home phone number, address, billing information, etc. The database server unit 244 is preferably a computer, such as an NT Window compatible computer.

The application server 242 of the communication node 212 is preferably connected to the LAN 240 and the content provider 209. The application server 242 allows the communication node 212 to access information from a destination of the information sources, such as the content providers and markup language servers. For example, the application server can retrieve information (i.e., weather reports, stock information, traffic reports, restaurants, flower shops, banks, calendars, "to-do" lists, e-commerce, etc.) from a destination of the information sources. This application server may include Starfish Software to provide the address book, calendar, and to-do lists and allow the user to organize information. The application server 242 processes the retrieved information and provides the information to the VRU server 234 and the voice browser 250. The VRU server 234 can provide an audio announcement to the user based upon the information using text-to-speech synthesizing or human recorded voice. The application server 242 can also send tasks or requests (i.e., transactional information) received from the user to the information sources (i.e., a request to place an order for a pizza). The application server 242 can further receive user inputs from the VRU server 234 based upon a speech recognition output. The application server is preferably a computer, such as an NT Windows compatible computer.

The voice markup language server 251 of the communication node 212 is preferably connected to the LAN 240. The markup language server 251 can include a database, scripts, and markup language documents or pages. The data markup language server 253 of the communication node 212 is also preferably connected to the LAN 240. The voice and date markup language servers 251 and 253 are preferably computers, such as an NT Window Compatible Computers. It will also be recognized that the markup language server 251 can be an Internet server (i.e., a Sun Microsystems server).

The messaging server 255 of the communication node 212 is preferably connected to the LAN 240, the paging network 211, an E-Mail system 285, and a short message system 290. The messaging server 255 routes pages between the LAN 240 and the paging network. The messaging server 255 is preferably a computer, such as an NT compatible computer. The message server can also provide email storage. It is contemplated that the messaging server 255 can reside externally from the node. The messaging server can further include Exchange Server software from Microsoft Corporation.

The voice browser 250 of the system 200 is preferably connected to the LAN 240. The voice browser 250 preferably receives information from the information sources, such as the content provider 209 via the application server 242, the data and voice markup language servers 251 and 257, the database 244, and the content provider 208, 209. In response to voice inputs from the user or DTMF tones, the voice browser 250 generates a content request (i.e., an electronic address) to navigate to a destination of one or more of the information sources. The content request can use at least a portion of a URL, an URN, an IP, a page request, or an electronic e-mail.

After the voice browser is connected to an information source, the voice browser preferably uses a TCP/IP connection to pass requests to the information source. The information source responds to the requests, sending at least a portion of the requested information, represented in electronic form, to the voice browser. The information can be stored in a database of the information source and can include text content, markup language document or pages, non-text content, dialogs, audio sample data, recognition grammars, etc. The voice browser then parses and interprets the information as further described below. It will be recognized that the voice browser can be integrated into the communication devices 201, 202, 203, and 204.

As shown in FIG. 6, the content provider 208 is connected to the application server 244 of the communication node 212, and the content provider 209 is connected to the gateway server 246 of the communication node 212 via the Internet 220. The content providers can store various content information, such as news, banking, v-commerce, e-commerce, weather, traffic conditions, etc. The content providers 208 and 209 can include a server to operate web pages or documents in the form of a markup language. The content providers 208 and 209 can also include a database, scripts, and/or markup language documents or pages. The scripts can include images, audio, grammars, computer programs, etc. The content providers execute suitable server software to send requested information to the voice browser.

The voice mail unit 274 of the telecommunication node 206 is preferably connected to the telephone switch 203 and the LAN 240. The voice mail unit 274 can store voice mail messages from users or other parties trying to send messages to users of the node. When a user accesses the telecommunication node 206, the voice mail unit 274 can notify the user of new and stored messages. The user can access the messages to play, delete, store and forward the messaged. When the user accesses a message, the message can be read to the user or can be displayed as textual information on a communication device (i.e., a pager, a SMS, or a PDA, etc.). The user can also access and operate external messages or mail systems remote from the telecommunication node 206.

The fax server unit 272 of the telecommunication node 206 is preferably connected to the telephone switch 230 and the LAN 240. The fax server unit 272 receivers and stores facsimile information sent via the electronic network 220 or the carrier switch 216. The users can access the facsimile information to play, store, delete, and forward the information. The facsimile information can be read to the user via the TTS unit 252 or can be displayed as textual information on a suitable communication device. The fax server unit 272 preferably comprises a computer such as, an NT compatible computer or a Dialogue Fax Server.

Further information regarding the communication system 200 is disclosed in U.S. patent application Ser. No. 09/141, 485 entitled Telecommunication System and Methods therefor, filed Aug. 27,1998, the entire disclosure of which is incorporated herein.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method of generating a bill for a user comprising the steps of:

receiving an incoming call from the user;

placing an outgoing call directed to a phone number of a called party;

creating a call record associated with the outgoing call after completion of the outgoing call, the call record including the phone number of the called party;

determining if the phone number of the called party stored in the call record matches any phone number stored in a database;

determining a name and a location associated with the phone number; and generating the bill having a plurality of entries, each entry including the name, the location, and a particular transport system of a plurality of transport systems associated with the phone number, wherein the plurality of transport systems route calls from one location to another.

2. A method of generating a bill comprising:

selecting a transport system among a plurality of available transport systems for a call, wherein the plurality of available transport systems route calls from one location to another;

selecting a carrier among a plurality of available carrier systems on the transport system for the call;

connecting the call between a subscriber with the transport system for a period of time; and generating the bill that identifies a plurality of calls and includes the transport system for each call and the carrier for each call.

3. The method of claim 2 wherein the bill further includes a quality of service for the period of time.

* * * * *